United States Patent Office 3,030,394
Patented Apr. 17, 1962

3,030,394
CYCLOPENTADIENYL(HYDROCARBO-
SILOXY) TITANIUM COMPOUNDS
Sydney A. Giddings, Darien, Conn., assignor to American Cyanamid Company, New York, N.Y., a corporation of Maine
No Drawing. Filed Aug. 24, 1961, Ser. No. 133,554
4 Claims. (Cl. 260—429.5)

This invention relates broadly to new and useful titanium compounds. More particularly it is concerned with compounds containing silicon-oxygen-titanium atoms bonded directly together in a linear chain. Still more particularly the invention is concerned with such compounds represented by the general formula (I)
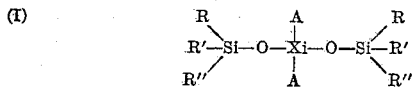

wherein A represents a radical selected from the group consisting of cyclopentadienyl and the lower alkyl-substituted cyclopentadienyl radicals, and each R, R' and R'' represents a hydrocarbon radical selected from the group consisting of alkyl radicals containing from 1 to 8 carbon atoms, inclusive, unsubstituted phenyl radical and lower alkyl-substituted phenyl radicals. The groups represented by R, R' and R'' can be the same or different, as may also those represented by A.

No pertinent prior art is known. The tetrakis(triorganosiloxy)titanium derivatives are old. For example, English and Sommer, J. Am. Chem. Soc., 77, 170 (1955), have described the synthesis of tetrakis(trimethylsiloxy)titanium, Ti[OSi(CH$_3$)$_3$]$_4$; and Zeitler and Brown, J. Am. Chem. Soc., 79, 4616 (1957), have reported the synthesis of tetrakis(triphenylsiloxy)titanium,

which decomposes at 460°–470° C. in an open tube and is only slightly soluble in various organic and inorganic solvents.

Illustrative examples of lower alkyl-substituted cyclopentadienyl radicals represented by each A in Formula I are the monomethyl-, dimethyl-, trimethyl- and tetramethylcyclopentadienyl radicals, and the mono- and poly- (i.e., di-, tri- and tetra-)ethyl-, propyl-, isopropyl-, n-butyl-, isobutyl-, sec.-butyl-, n-amyl-, isoamyl-, etc., cyclopentadienyl radicals.

Illustrative examples of hydrocarbon radicals represented by each R, R' and RR'' in Formula I are, in addition to the aforementioned unsubstituted phenyl radical, the alkyl radicals ranging from methyl through octyl, including both the normal and isomeric forms thereof; and the lower alkyl-substituted phenyl radicals wherein each individual alkyl substituent contains, for instance, from 1 to about 5 carbon atoms (numerous examples of which have been given in the preceding paragraph wtih reference to the lower alkyl-substituted cyclopentadienyl radicals) and of which either one, two, three, four or five such lower alkyl substituents are attached directly to the phenyl nucleus.

The titanium siloxy compounds of this invention are useful, for instance, as chemical intermediates in the preparation of organic materials containing both titanium and silicon in the molecule; also, as polymerization or curing catalysts and as petroleum additives, e.g., as antiknock agents, ignition promoters, prevention of preignition, etc. Their extremely high hydrolytic stability and hydrophobic characteristics combined with their ready solubility in aliphatic and aromatic hydrocarbon solvents, as well as others, make them extremely useful and valuable in fields of utility for which the prior-art tetrakis(triorganosiloxy)titanium compounds are entirely unsuited. Such properties, especially hydrolytic and solubility characteristics, were entirely unobvious and unexpected and in no way could have been predicted from the known properties of the prior-art compounds or from compounds which are analogous thereto.

The symmetrical compounds of this invention can be prepared, for example, by reacting together under heat (1) sodium triorganosilanolate (obtained by reacting together a molar excess, i.e., an excess over equivalent molar proportions, of metallic sodium with the corresponding tri-organosilanol dissolved in an anhydrous hydrocarbon solvent, e.g., toluene) and (2) a bis("cyclopentadienyl") titanium dihalide, specifically the dichloride or the dibromide. (By "organo" in the above-mentioned triorgano compounds is meant one or another of the radicals represented by A in Formula I.) The silanolate of (1) and the dihalide of (2) are reacted together in the ratio of about two moles of the former to one mole of the latter.

In the preferred method the bis(cyclopentadienyl)titanium dihalide is added to the toluene (or other solvent) solution of the sodium tri-organosilanolate from which the excess sodium has been removed, followed by refluxing for a suitable period, e.g., from 15 minutes to 2 or 3 hours or more. The hot solution is filtered and cooled. Crystals of tetrakis(tri-organosiloxy)titanium are deposited, and these are removed by suitable means, e.g., by filtration. An additional amount of the tetrakis compound is usually obtained by reducing the volume of the filtrate under heat and then cooling.

The resulting solution, from which substantially all of the tetrakis compound has been removed, is then vacuum-evaporated to dryness to yield a solid product comprising the desired bis("cyclopentadienyl")bis(triorganosiloxy)titanium. This desired material is isolated from the crude solid product by any suitable means, for instance by extracting with a suitable solvent, e.g., acetone. It can be further purified, if desired, by recrystallizing from the same or a different solvent.

The unsymmetrical compounds of the instant invention can be prepared, for instance, by using as a starting reactant sodium tri-organosilanolate wherein the organo radicals are mixed organo radicals corresponding to those desired in the end-product; and/or by using a bis("cyclopentadienyl")titanium dihalide, specifically the dichloride, wherein the "cyclopentadienyl" groups (i.e., radicals represented by A in Formula I) are different from each other.

Another method of producing the unsymmetrical compounds of the present invention is to react approximately one mole of each of two different sodium tri-organosilanolates wherein the organo groups are different with approximately one mole of a bis("cyclopentadienyl")-titanium dihalide, specifically the dichloride, and wherein the "cyclopentadienyl" groups are the same or different.

In order that those skilled in the art may be better understood how the present invention can be carried into effect, the following examples are given by way of illustration and not by way of limitation. All parts and percentages are by weight unless otherwise stated.

Example 1

This example illustrates the preparation of bis(cyclopentadienyl)bis(triphenylsiloxy)titanium, the formula for which is (II)

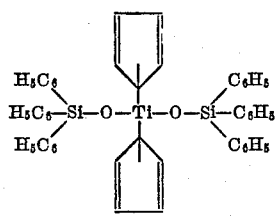

Triphenylsilanol is first prepared by suspending 50 g. of triphenylchlorosilane in 1000 ml. of water. Solid potassium hydroxide is added until the solution is neutral. After 3 hours of rapid stirring the resulting white solid comprising triphenylsilanol is removed by filtration and recrystallized from a mixed solvent consisting of about equal parts by volume of diethyl ether and petroleum ether.

Into a dry vessel, flushed with nitrogen, is added 20 g. (0.0725 mole) of the triphenylsilanol produced as described above, and 500 ml. of anhydrous toluene. Metallic sodium (2.3 g.; 0.1 mole) is added to the reaction vessel, and the mixture is heated under reflux at the boiling temperature of the reaction mass (i.e., the mixture is refluxed) until evolution of hydrogen has ceased. The solution is cooled to about 20°–50° C. The unreacted sodium, upon cooling the solution, generally collects together in the form of a rounded mass. This mass of unreacted sodium is conveniently removed from the solution, e.g., by spearing it with a dry, sharp instrument or with dry tweezers or prongs.

Bis(cyclopentadienyl)titanium dichloride (9.15 g.; 0.0363 mole) is added to the reaction mixture which is then refluxed for about 30 minutes. The hot solution is filtered and, on cooling, pale yellow crystals comprised of tetrakis(triphenylsiloxy)titanium, Ti[OSi($C_6H_5$)$_3$]$_4$, are deposited. These crystals are removed by filtration and dried; yield, 4.1 g. The filtrate is reduced in volume under heat to 50 ml., and a further yield of 2.1 g. of tetrakis-(triphenylsiloxy)titanium is obtained upon cooling the mass.

The solution substantially free from the tetrakis compound is then vacuum-evaporated to dryness, and the solid product thereby obtained is extracted with 50 ml. of acetone and again evaporated to dryness, yielding 3.6 g. of product. This product can be further purified by recrystallizing from acetone. The purified material is obtained as white crystals; M.P. 202°–203° C. Analytical data and infrared spectra establish the product to be bis-(cyclopentadienyl)bis(triphenylsiloxy)titanium.

Analysis:

$(C_5H_5)_2[(C_6H_5)_3SiO]_2Ti$

|  | C | H | Mol. Wt. |
|---|---|---|---|
| Theoretical | 75.80 | 5.53 | 728.8 |
| Found | 75.87 | 5.53 | 739.0 |

Infrared spectra show similar —Ti—O—Si— and phenyl bonds as in the known compound tetrakis(triphenylsiloxy)titanium, together with bands at 3062, 1018 and 815 cm.$^{-1}$, which are indicative of π-bonded cyclopentadienyl groups. The product is soluble in aliphatic hydrocarbons including hexane, heptane, octane, nonane and higher members of the homologous series; in aromatic hydrocarbons, e.g., benzene, toluene and xylene; in ketones, e.g., acetone, methyl ethyl ketone, etc.; and in other commercially available solvents.

Example 2

The compound, bis(methylcyclopentadienyl)bis(tri-p-tolylsiloxy)titanium, the formula for which is (III)

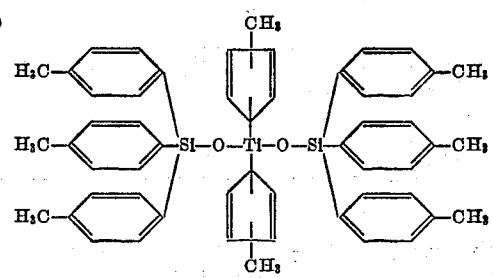

is prepared in essentially the same manner as described under Example 1 with reference to the production of bis(cyclopentadienyl) bis(triphenylsiloxy)titanium with the exception that instead of triphenylsilanol there is used an equivalent molar amount of tri-p-tolylsilanol; and, instead of bis(cyclopentadienyl)titanium dichloride, there is used an equivalent molar amount of bis(methylcyclopentadienyl)titanium dichloride. The product is identified by analysis and infrared spectra as bis(methylcyclopentadienyl)bis(tri-p-tolylsiloxy)titanium.

The corresponding bis(-tri-o-tolylsiloxy) and bis(tri-m-tolylsiloxy)titanium derivatives are produced in exactly the same way as described above, using an equivalent amount of tri-o-tolylsilanol or tri-m-tolylsilanol in place of tri-p-tolylsilanol in making the corresponding tri-organosilanolates.

Example 3

This example illustrates the preparation of bis(cyclopentadienyl)bis(tri-n-octylsiloxy)titanium, the formula for which is (IV)

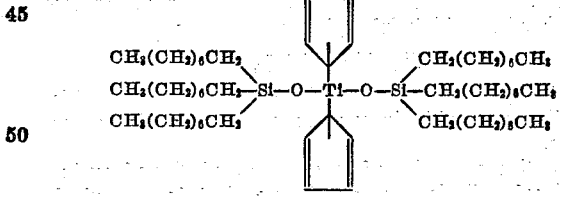

Essentially the same procedure is followed in making this compound as given in Example 1 concerning the preparation of bis(cyclopentadienyl)bis(triphenylsiloxy)titanium with the exception that an equivalent molar amount of tri-n-octylsilanol is used in place of triphenylsilanol. Tri-n-octylsilanol is prepared from tri-n-octylchlorosilane as described in Example 1 with reference to the preparation of triphenylsilanol from triphenylchlorosilane.

The product is identified by analysis and infrared spectra as bis(cyclopentadienyl)bis(tri-n-octylsiloxy)titanium.

The corresponding bis(trimethylsiloxy)titanium derivative is prepared in exactly the same manner as just described for the preparation of the bis(tri-n-octylsiloxy)-titanium derivative with the exception that an equivalent molar amount of trimethylsilanol is employed instead of tri-n-octylsilanol in making the corresponding triorganosilanolate.

Example 4

This example illustrates one of the many fields of utility of the compounds of the present invention, specifically bis(cyclopentadienyl)bis(triphenylsiloxy)titanium, as a catalyst ingredient in a low-bake furniture finish.

|  | Parts |
|---|---|
| Solution of butylated urea-formaldehyde resin (55% resin solids, 45% of a 50–50 solvent mixture of butanol and xylene) | 100.0 |
| Solution of a glyceryl phthalate resin modified with rosin and linseed oil acids (50% resin solids, 50% xylene) | 100.0 |
| Catalyst (solution of 40% methyl acid pyrophosphate dissolved in a solvent comprising mainly butanol) | 5.0 |
| Catalyst [solution of 20% of bis(cyclopentadienyl)-bis(triphenylsiloxy)titanium dissolved in xylene] | 10.0 |
| Xylene | 12.0 |
| Butanol | 20.0 |
| Flattening agent, specifically silica gel | 7.5 |

The silica gel is ground into the other components of the above-described composition, which is a low-bake furniture finish, using regular pebble-mill technique. After grinding for 24 hours, the amount of flatting agent is adjusted to give a gloss rating of 80 on the 60° Gardner glossometer. The 10 parts of the solution of 20% of bis(cyclopentadienyl)bis(triphenylsiloxy)titanium dissolved in xylene materially accelerates the curing of the applied finish on furniture as compared with the same composition when applied on furniture and tested in the same manner.

I claim:

1. A compound of the class represented by the general formula

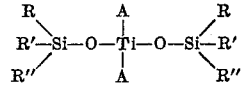

wherein A represents a radical selected from the group consisting of cyclopentadienyl and the lower alkyl-substituted cyclopentadienyl radicals, and each R, R' and R'' represents a hydrocarbon radical selected from the group consisting of alkyl radicals containing from 1 to 8 carbon atoms, inclusive, unsubstituted phenyl radical and lower alkyl-substituted phenyl radicals.

2. Bis(cyclopentadienyl)bis(triphenylsiloxy)titanium.

3. Bis(methylcyclopentadienyl)bis(tri - p - tolylsiloxy)-titanium.

4. Bis(cyclopentadienyl)bis(tri - n - octylsiloxy)titanium.

No references cited.

UNITED STATES PATENT OFFICE
CERTIFICATE OF CORRECTION

Patent No. 3,030,394            April 17, 1962

Sydney A. Giddings

It is hereby certified that error appears in the above numbered patent requiring correction and that the said Letters Patent should read as corrected below.

Column 1, lines 16 to 19, formula (I) center portion thereof, for "Xi" read -- Ti --; line 57, for "wtih" read -- with --; column 2, line 65, strike out "be"; column 3, line 1, for "understood" read -- understand --.

Signed and sealed this 7th day of August 1962.

(SEAL)
Attest:

ERNEST W. SWIDER
Attesting Officer

DAVID L. LADD
Commissioner of Patents